(12) United States Patent
Dalsgaard et al.

(10) Patent No.: US 7,916,675 B2
(45) Date of Patent: Mar. 29, 2011

(54) METHOD AND SYSTEM FOR PROVIDING INTERIM DISCONTINUOUS RECEPTION/TRANSMISSION

(75) Inventors: Lars Dalsgaard, Oulu (FI); Leping Huang, Saitama-ken (JP); Jukka Ranta, Kaarina (FI)

(73) Assignee: Nokia Corporation, Espoo (FI)

( * ) Notice: Subject to any disclaimer, the term of this patent is extended or adjusted under 35 U.S.C. 154(b) by 876 days.

(21) Appl. No.: 11/537,864

(22) Filed: Oct. 2, 2006

(65) Prior Publication Data

US 2007/0291728 A1 Dec. 20, 2007

(51) Int. Cl.
| G08C 17/00 | (2006.01) |
| H04B 7/212 | (2006.01) |
| H04B 7/00 | (2006.01) |
| H04B 1/16 | (2006.01) |
| H04L 12/28 | (2006.01) |
| H04M 1/00 | (2006.01) |
| H04M 3/42 | (2006.01) |
| H04W 4/00 | (2009.01) |
| H04W 40/00 | (2009.01) |

(52) U.S. Cl. ........ 370/311; 370/347; 370/350; 455/574; 455/515; 455/466; 455/434; 455/414.1; 455/343.4; 455/518; 455/445

(58) Field of Classification Search .............. 370/311, 370/347
See application file for complete search history.

(56) References Cited

U.S. PATENT DOCUMENTS

| 7,184,425 | B2* | 2/2007 | Carlsson ................. 370/345 |
| 2001/0015963 | A1* | 8/2001 | Tuomainen et al. ........ 370/311 |
| 2002/0048317 | A1* | 4/2002 | Boer et al. ................. 375/219 |
| 2003/0137969 | A1* | 7/2003 | Abdesselem et al. ....... 370/350 |
| 2005/0009527 | A1* | 1/2005 | Sharma ..................... 455/445 |
| 2005/0176474 | A1* | 8/2005 | Lee et al. .................. 455/574 |
| 2006/0084408 | A1* | 4/2006 | Wan ......................... 455/343.4 |

* cited by examiner

*Primary Examiner* — Dwayne D Bost
*Assistant Examiner* — Timothy Pham
(74) *Attorney, Agent, or Firm* — Ditthavong Mori & Steiner, P.C.

(57) ABSTRACT

A method, terminal device, network element, system and computer program product for controlling discontinuous reception or transmission at a terminal device of a communication network are disclosed. A regular discontinuous reception or transmission cycle of a regular discontinuous reception or transmission scheme is set by using a first control layer, and in addition thereto a shorter temporary discontinuous reception or transmission cycle of an interim discontinuous reception or transmission scheme can be set by using a second control layer. This arrangement provides long discontinuous reception or transmission cycles for power consumption improvements while at the same time ensuring that the network can easily and flexibly shorten these cycles for increased data throughput, if needed.

51 Claims, 7 Drawing Sheets

METHOD AND SYSTEM FOR PROVIDING INTERIM DISCONTINUOUS RECEPTION/TRANSMISSION

FIELD OF THE INVENTION

The invention, according to various embodiments, relates to communications, and particularly, to controlling reception or transmission in a terminal device of a communication network.

BACKGROUND OF THE INVENTION

Discontinuous reception (DRX) is a method used in communication networks to conserve battery energy of terminal devices, e.g., mobile devices or user equipments (UE). The UE and the network negotiate phases in which data transfer happens. During other times the device turns its receiver off and enters into a low-power state. On the other hand, discontinuous transmission (DTX) is a method of momentarily powering-down, or muting, a terminal device, e.g., a mobile or portable terminal, when there is no input data to the terminal device. This optimizes the overall efficiency of a wireless voice communications system.

One major aspect affecting the UE stand-by time is the possibility to inactivate the UE receiver circuitry. In the Universal Mobile Telecommunications System (UMTS) Radio Access Network (UTRAN), this is mainly utilized in paging states, where the UE is listening periodically to the paging channel. DRX period(s) and triggers/timers which result in DRX are typically configured by Radio Resource Control (RRC) functionality. Alternatively, the network may direct inactive UEs to DRX by explicit commands. Configuring long DRX periods allows for long standby times with the expense of elevated wake-up times for network-initiated data transfers.

In a packet based system, it is assumed that all resources are assigned more or less temporarily by the network to the UE by use of allocation tables (AT) or more general by use of a downlink (DL) resource assignment channel or a DL shared control channel. Reception of allocation tables is periodic and determined by the DRX period in use. The network will schedule possible resource allocations to the UE through AT which will be received by the UE at each DRX cycle. These assignments or allocations may be grouped into one-time allocations and persistent allocations. One-time allocations mean that the resources allocated to the UE in the received AT is valid only in the following sub-frame. The next allocation is then received through the next received AT. On the other hand, persistent allocation may assign allocation that may be valid for a predetermined period of time. This means that the allocations received may be valid, e.g., until next AT is received.

Consequently, DRX has direct impact on how often the network is able to address the UE. The need for the network to be able reach/address a UE depends on the connection type(s) between the UE and network. In case of a streaming connection, the DRX cycle will most probably be different than in case of a mail download. This is linked to the quality of service (QoS) of the connection.

As UE power consumption greatly depends on how often UE has to turn on its transceiver, it is clear from the above description that the DRX interval has impact on UE power consumption. This means that one key to power saving in Long Term Evolution (LTE) is to make it possible to optimize the use of DRX in such a way that the network always can utilize the longest possible DRX taking the connection restrictions into account.

Long DRX periods though will have negative impact on the data throughput in general as the networks capability to reach the UE decreases as the DRX interval increases. Long DRX will also impact the network packet schedulers possibility and flexibility to change the resources allocated to the UE. Limiting the packet schedulers possibility to change the resources used by a UE might have impact on the overall system in the way that the air interface resources are not used in an optimal way. Waste of air interface resources in a wireless system should minimized when ever possible as this is normally the most limited resource.

Thus, the DRX cycles control when the UE is reachable in general either for UL or DL resource allocation through the AT. It thus follows that longest possible DRX or DTX periods should be used in order to ensure good power saving possibilities for UE, while shortest possible DRX or DTX periods should be used in order to ensure good and fast throughput to and from the UE and allow for flexibility in the UE resource assignments, seen from network packet scheduler point of view.

SUMMARY OF SOME EXEMPLARY EMBODIMENTS

Therefore, there is a need to provide a method and system for controlling discontinuous reception (DRX) or discontinuous transmission (DTX), by means of which a very flexible DRX/DTX scheme can be achieved.

According to an embodiment of the invention, a method of controlling discontinuous reception or transmission at a terminal device of a communication network is disclosed; said method comprising:
  setting a regular discontinuous reception or transmission cycle of a regular discontinuous reception or transmission scheme by using a first control layer; and
  setting a shorter temporary discontinuous reception or transmission cycle of an interim discontinuous reception or transmission scheme by using a second control layer.

According to another embodiment of the invention, a terminal device for controlling discontinuous reception or transmission of a data from a communication network is disclosed; said terminal device comprising:
  first timer means for timing a regular discontinuous reception or transmission cycle of a regular discontinuous reception or transmission scheme;
  second timer means for timing a shorter temporary discontinuous reception or transmission cycle of an interim discontinuous reception or transmission scheme; and
  setting means for setting said first timer means based on an information received via a first control layer, and for setting said second timer means based on an information received via a second control layer.

According to yet another embodiment of the invention, a network element for controlling discontinuous reception or transmission at a terminal device of a communication network is disclosed; said network element comprising:
  first setting means for signaling information used for setting a regular discontinuous reception or transmission cycle of a regular discontinuous reception or transmission scheme by using a first control layer; and
  second setting means for signaling information used for setting a shorter temporary discontinuous reception or transmission cycle of an interim discontinuous reception or transmission scheme by using a second control layer.

Accordingly, certain embodiments of the invention provide for long DRX or DTX periods with a possibility to flexibly change to a short interim DRX or DTX scheme. This enables fast but secure assignment of short DRX or DTX whenever seen necessary by network. Additionally, enhanced power saving capabilities are obtained in the active state of the terminal device by using long DRX or DTX cycles in the active state, while the network may fast, flexibly and secure change the DRX or DTX scheme to provide a fast and flexible increase in data throughput/flow. DRX or DTX patterns can thereby be changed in a fast manner if traffic or other conditions change. DRX or DTX cycles may thus become more irregular and faster adjustable to the data patterns of the terminal device.

The temporary discontinuous reception or transmission cycle may be set when the terminal device has been addressed for data reception. Thus, the DRX or DTX cycle or period can be responsively reduced at any desired data reception.

The second control layer may be selected to provide faster control signaling than the first control layer. Thereby, it can be ensured that a fast switching to the interim DRX or DTX scheme is obtained. According to a specific example related to a wireless communication environment, the first control layer may be a radio resource control layer. In this or other examples, the second control layer may be a media access control layer which allows faster control signaling.

Furthermore, the setting of the temporary discontinuous reception or transmission cycle may be achieved for example by signaling at least one of a starting time, an interval, and a life-time for said interim discontinuous reception or transmission scheme via the second control channel. As an example, the interval may be defined based on a modulus of the regular discontinuous reception or transmission cycle. As another example, lifetime of the interim DRX scheme can be represented or indicated by the number of frames which can be received within the interim DRX, the number of interim DRX cycles within one regular DRX cycle, or an "end-bit" as MAC signaling at the end of interim DRX to indicate the end of that interim DRX. As a further option, the lifetime of interim DRX scheme may be set to be equal to the length of one regular DRX cycle. Alternatively, the life-time may be pre-defined by a default value. Such a default value may for example correspond to the time period until the start of the next regular discontinuous reception or transmission cycle.

The setting of the temporary discontinuous reception or transmission cycle may be achieved by distributing predetermined interim discontinuous reception or transmission patterns and signaling a selected one to the concerned terminal device. This option allows more optimized signaling and reduced need for definitions.

As an additional option, the setting of the temporary discontinuous reception or transmission cycle may comprise indicating a next uplink or downlink resource. Thereby, the load on broadcast of ATs or the like can be reduced when the interim DRX or DTX scheme points directly to the next uplink or downlink resource.

Optionally, the interim discontinuous reception or transmission scheme may be set to be valid only for one of the regular discontinuous reception or transmission cycles. This option ensures minimal impact of possible error situations. Additionally, a fallback to the regular discontinuous transmission scheme may be initiated, if a failure has been detected in the interim discontinuous transmission scheme. Thus, synchronization between the terminal device and the network can be maintained.

Additionally, setting of the discontinuous reception or transmission scheme may be controlled based on a dynamic interaction between the regular discontinuous reception or transmission scheme and the interim discontinuous reception or transmission scheme, wherein the dynamic interaction comprises a decision whether to send the first control layer signaling to adjust the regular discontinuous reception or transmission cycle or to send the second control layer signaling to adjust the interim discontinuous reception or transmission cycle. As an example, this decision may be based on at least one of traffic load estimation, at least one radio condition on the air interface to the terminal device, and an algorithm used to calculate signalling overhead.

According to yet another embodiment, the first and second control layers may correspond to one and the same control layer. In this case, the first and second setting means or units of the network element are configured to perform their above settings by using this one and same control layer. Similarly, the setting means or unit of the terminal device is then configured to perform both its above settings based on information received via this one and same control layer.

Further advantageous modifications are described in the dependent claims.

BRIEF DESCRIPTION OF THE DRAWINGS

The invention will now be described in greater detail based on a preferred embodiment with reference to the accompanying drawings, in which.

DESCRIPTION OF THE PREFERRED EMBODIMENT

In the following, certain embodiments of the invention will be described based on a discontinuous reception (DRX) scheme for a wireless connection between a mobile terminal and a base station device of a radio access network, such as evolved UTRAN (E-UTRAN) for example. The skilled person will readily acknowledge or understand that the proposed concept of certain embodiments can be transferred well to a discontinuous transmission (DTX) scheme.

Figure 1:
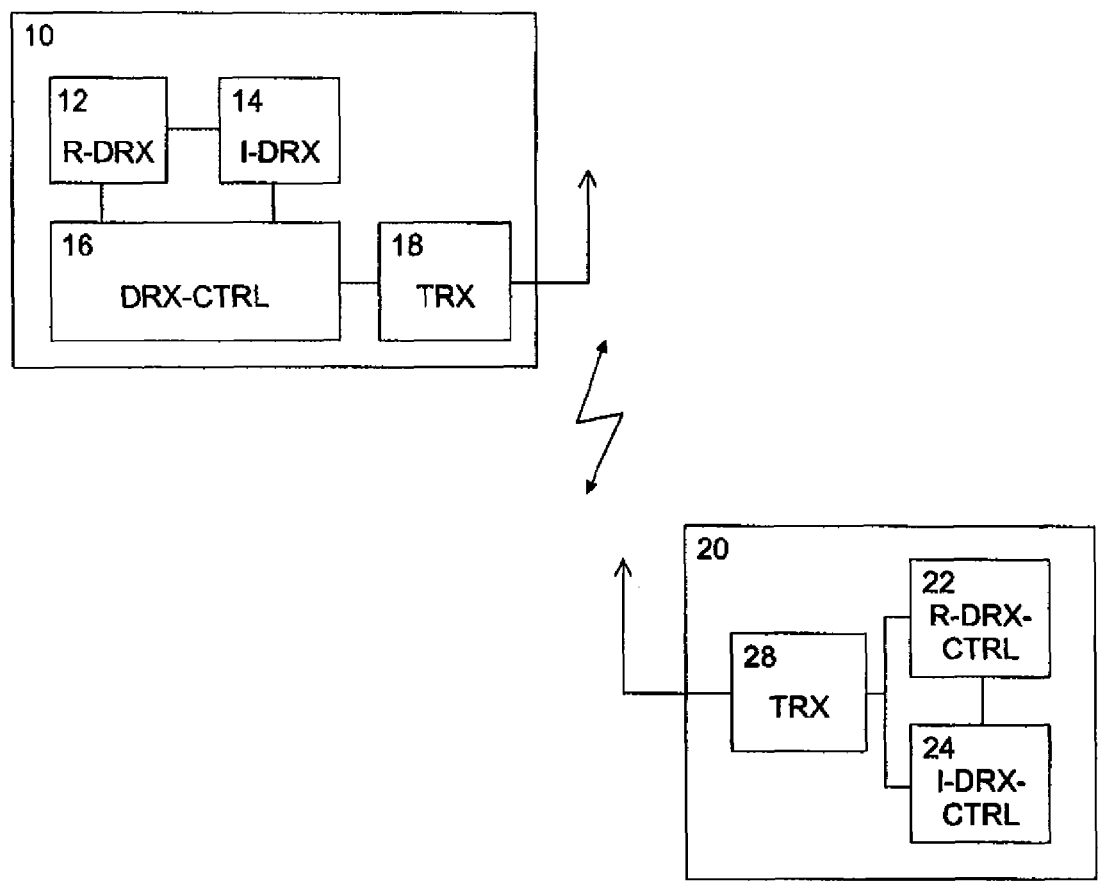
FIG. 1 shows a schematic block diagram of a terminal device and a network element according to one embodiment of the invention.

FIG. 1 shows schematic block diagrams of the mobile terminal or UE 10 and the base station device or node B 20 of the radio access network (in the following referred to more generally as "network"). Both the UE 10 and the node B 20 comprise respective transceiver (TRX) circuits 18, 28 for enabling transmission and reception of wireless signals. It is noted that the block diagrams of FIG. 1 only comprise those components required for understanding the DRX scheme according to the preferred embodiment. Other components have been omitted for reasons of simplicity.

According to the one embodiment of the invention, flexibility of the DRX scheme is ensured in such a way that fast but secure assignment of short DRX cycles is supported whenever seen necessary by the network. For this purpose, two levels or schemes of DRX, which are referred to in the following as "Regular DRX" and "Interim DRX", are introduced. As explained before, Regular DRX is determined and assigned to the UE 10 by the network and based on the current connection requirements. To this end, the node B comprises a Regular DRX control function or unit 22 which serves to provide control signalling by using a suitable control layer for setting and controlling the Regular DRX scheme. Typically but not necessarily, the Regular DRX control unit 22 may use the RRC (Radio Resource Control) protocol layer for setting or changing the Regular DRX scheme. Thus, the Regular DRX control unit may be part of or controlled by the RRC entity of the network.

The additional Interim DRX scheme provides an option for (temporarily) increasing or boosting data traffic throughput compared to what is possible with currently used Regular DRX settings. Thus, by applying Interim DRX it is possible for the network, e.g., through the Regular DRX control unit 22, to assign a longer Regular DRX to the UE 10 (e.g., for bursty data traffic) without loosing the possibility to easily increase the data throughput when needed (when data is available). The control signaling required for setting and controlling the Interim DRX scheme is provided by an Interim DRX control function or unit 24 of the node B 20 by using a suitable other control layer. Thereby, it is possible to reach the two goals of providing long DRX for UE power consumption improvements in the active state of the UE 10 while at the same time ensuring that the network can easily and flexibly shorten the DRX period (for increased data throughput) when needed.

However, Interim DRX is not handled through RRC signalling of the RRC layer. It may be handled for example through control signalling of the Medium Access Control (MAC) layer. As MAC is protected by Hybrid Automatic Repeat Request (HARQ) but not ARQ, it may be less robust compared to RRC signalling. This may be taken into account when designing the handling of possible error situations.

At the UE 10, DRX is achieved by controlling the TRX circuit 18 by a DRX control unit 16 which selectively derives or obtains DRX timings from a Regular DRX timer 12 and an Interim DRX timer 14. The Regular and Interim DRX timers 12, 14 are set or initialized by the DRX control unit 16 based on respective control signalling received from the node B and provided by the Regular and Interim DRX control units 22, 24.

As an additional option, an intelligent decision may be made based on a dynamic interaction between Regular DRX and Interim DRX, to decide whether to send the first control layer signalling in order to adjust the Regular DRX interval, or to send the second control layer signaling in order to adjust the Interim DRX interval. To achieve this, connection lines between the Regular and Interim DRX timers 12, 14 and between the Regular and Interim DRX control units 22, 24 are provided for enabling mutual exchange of information between these units. The intelligence or decision-making process can be based on at least one of traffic load estimation (e.g., whether an increase in traffic is temporary or long term), radio condition(s) on the air interface to the UE 10, and some algorithm used to calculate signalling overhead.

It is clear that the Regular and Interim DRX timers 12, 14 and the DRX control unit 16 of the UE 10, as well as the Regular and Interim DRX control units 22, 24 of the node B 20 may be implemented as programs or subroutines controlling a processor device or computer device to implement the required functionalities. Alternatively, implementation of the above functionalities may be achieved by discrete hardware circuits or units.

In the following, the functionality of Interim DRX and its interaction with Regular DRX is described with reference to FIG. 2 through an example as seen from UE's point of view.

Figure 2:
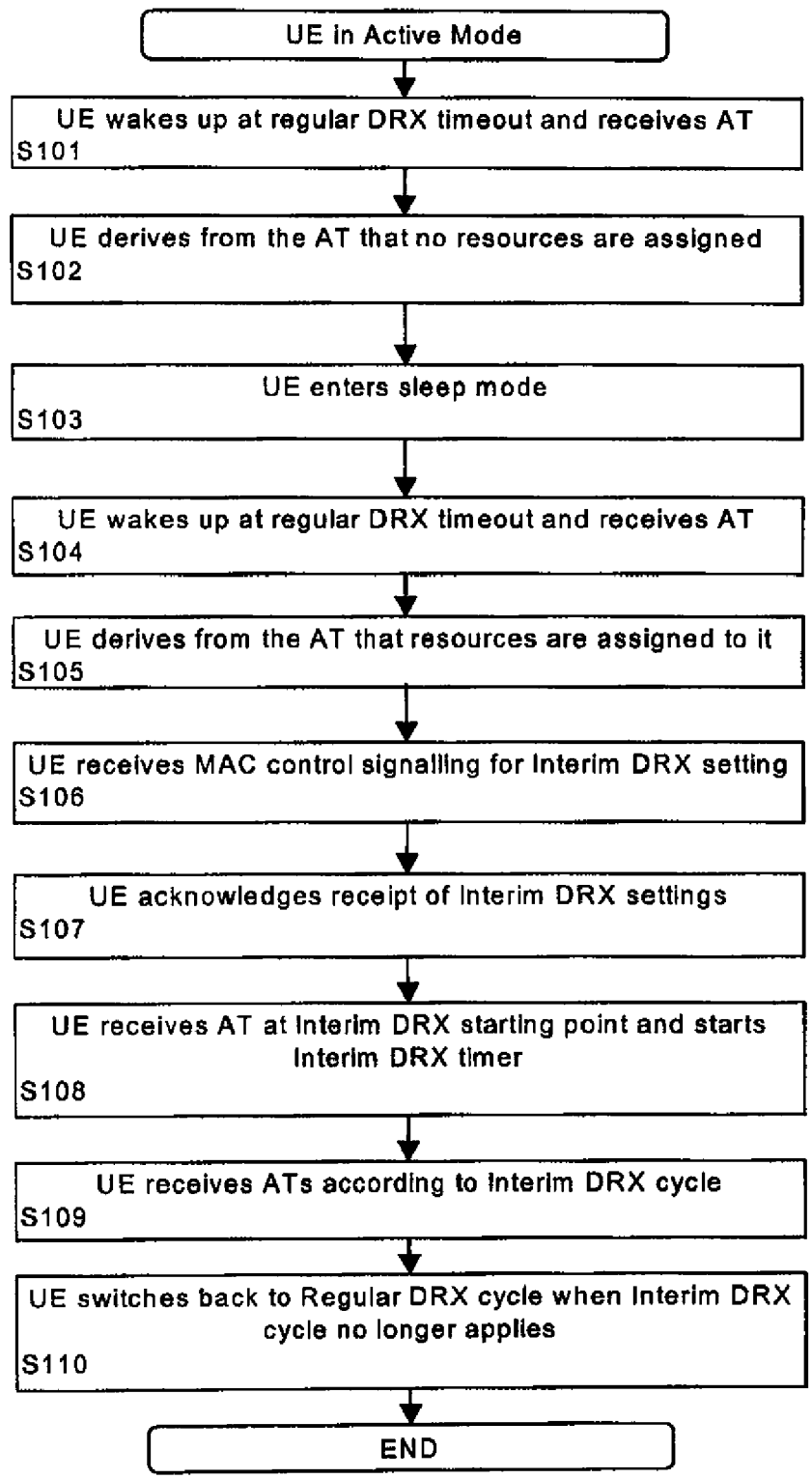
FIG. 2 shows a schematic flow diagram of a interaction procedure between a regular discontinuous reception (DRX) scheme and an interim DRX scheme according to one embodiment of the invention.

FIG. 2 shows a schematic flow diagram of a interaction procedure between a regular DRX scheme and an interim DRX scheme according to an exemplary embodiment. It is assumed that the UE 10 is in the active mode and has been assigned a Regular DRX cycle, e.g., by control signalling received from the Regular DRX control unit 22 of the node B 20 and determined based on the current connection requirements. In the active mode, the UE 10 is able to perform UL/DL transport with very limited access.

At Regular DRX timeout signaled by the Regular DRX timer 12, the UE 10 wakes up and receives an AT (step S101). Then, the UE 10 derives from the received AT that no resources are assigned to the UE 10, neither in UL nor in DL (step S102). Consequently, the UE 10 enters into a sleep mode with low power consumption (step S103).

At the next Regular DRX timeout in step S104, the UE 10 wakes up again and receives a new AT. Then, in step S105, the UE 10 derives from the new AT that it is addressed and UL and DL resources have been assigned to it. In the following step S106 the UE 10 receives its DL data which includes MAC control signaling for Interim DRX settings provided by the Interim DRX control unit 24 of the node B 20. In response thereto, the UE 10 replies in step S107 with 'ACK' in the UL direction and the network hereby knows that the UE 10 has successfully received the Interim DRX settings and will take those into use.

In step S108, the UE 10 receives the first AT according to the Interim DRX starting point indicated by the received Interim DRX settings, and the DRX control unit 16 of the UE 10 sets and starts the Interim DRX timer 14. Thereafter, the UE 10 follows the Interim DRX scheme (while the Regular DRX rules may still apply) and receives AT's according to this shorter Interim DRX cycle (step S109). When Interim DRX cycle no longer applies, the UE 10 again obeys the Regular DRX cycle (step S10). Then, the procedure may start again at step S101 after it has entered the sleep mode in the Regular DRX scheme.

It is noted that the Regular DRX cycle is kept unchanged during the Interim DRX scheme and is not influenced by the fact that the Interim DRX scheme has been activated.

The control signaling provided by the Interim DRX control unit 24 or by any other network function and needed in order to control the Interim DRX at the UE 10 may comprise at least one of an Interim DRX starting point (or starting time), an Interim DRX interval which defines the length of the Interim DRX cycle and which could be a modulus (MOD) of the Regular DRX interval/cycle or which could be a specific number, and a life-time of the Interim DRX scheme. The life-time can be defined in terms of time or frames etc., in terms of repetitions of interval/cycles, by a specific end-bit, or the life-time could be set by default until the start of the next Regular DRX cycle.

Figure 3A:
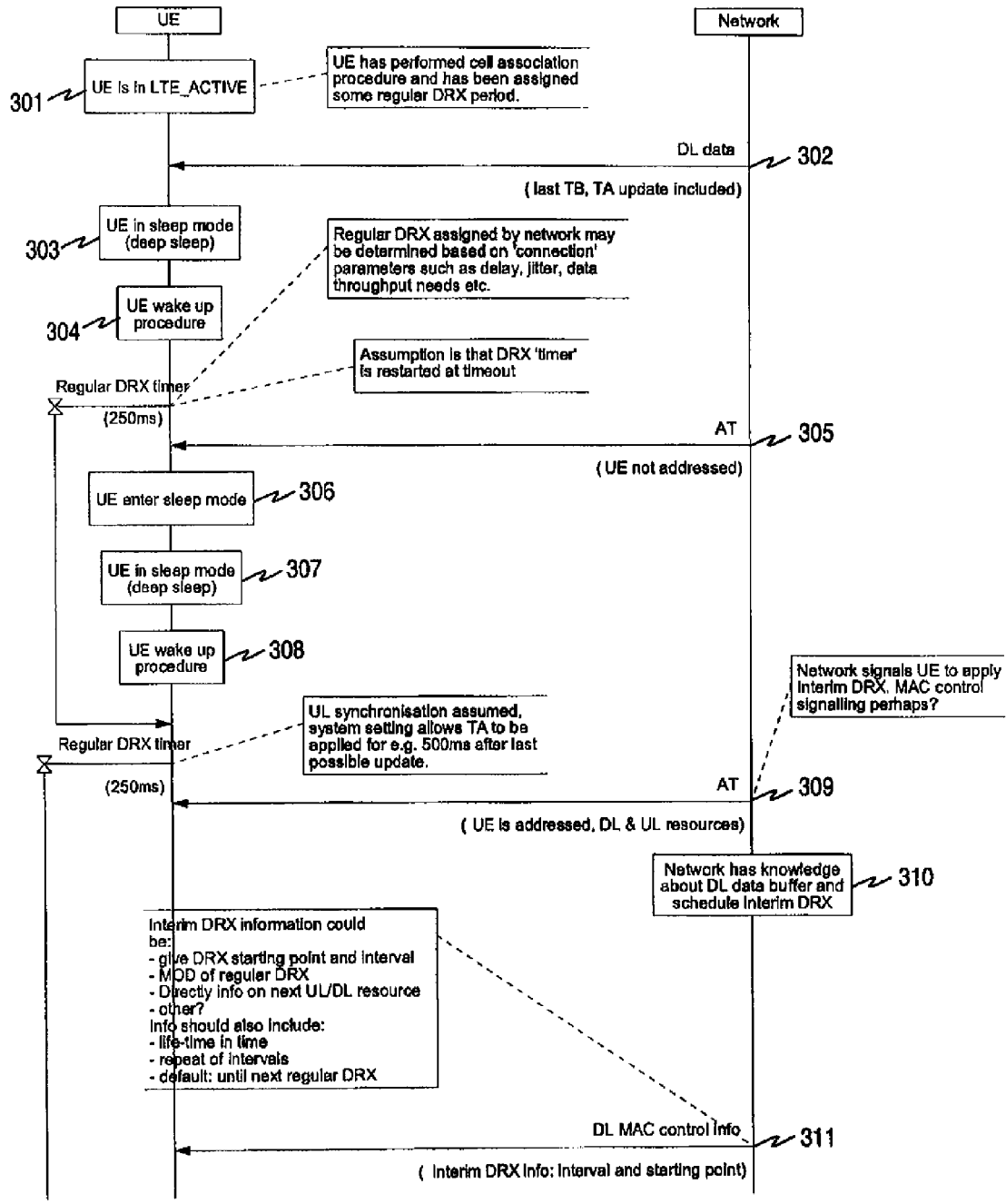
FIGS. 3A and 3B show respective portions of a signaling and processing diagram of an implementation example of a basic interim DRX concept according to one embodiment of the invention.
Figure 3B:
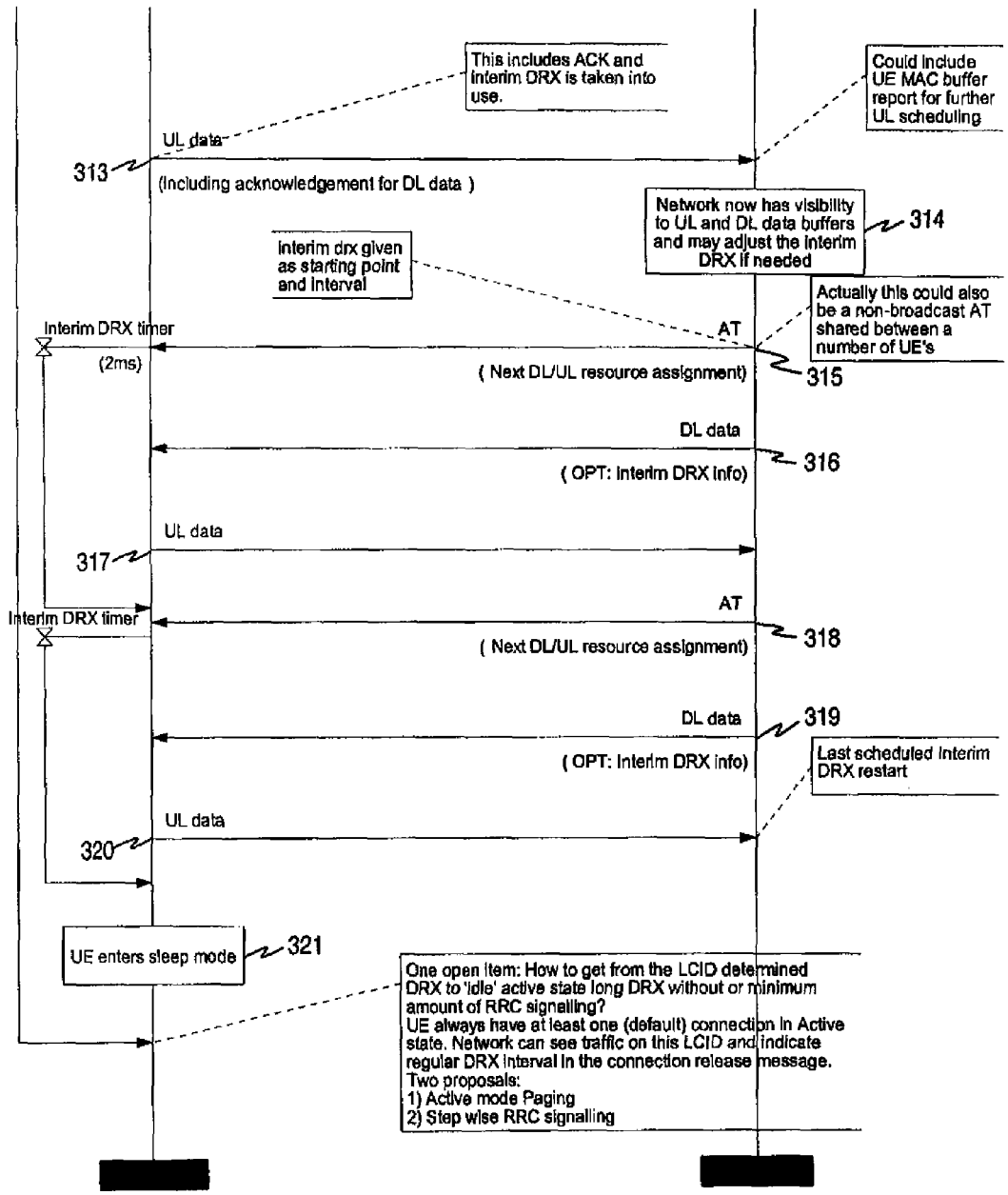

FIGS. 3A and 3B show respective portions of a signaling and processing diagram of a more detailed implementation example of a basic interim DRX concept in an E-UTRAN environment, according to an exemplary embodiment. In the diagram, processing steps at and signaling flows between the UE 10 and the network, i.e., node B 20, are shown, while the time proceeds from the top to the bottom.

At the beginning of the procedure, as indicated in FIG. 3A, it is again assumed that the UE 10 is in the active mode ("LTE_ACTIVE"), step 301, which means that it has performed a cell association procedure and has been assigned some regular DRX period. When the UE 10 receives DL data (step 302), the transmitted data flow includes the last TB (transport block), which may be the unit of data packages which is sent over the air, and possibly an updated TA (Timing Advance). Then, the UE 10 is set, as in step 303, into the sleep mode (e.g., deep sleep). Based on the active DRX cycle, the UE 10 initiates a wake-up procedure, per step 304, in accordance with the Regular DRX settings (e.g., 250 ms) assigned by the network, e.g., based on "connection" parameters such as delay, jitter, data throughput needs, etc. Moreover, it is assumed that the Regular DRX timer 12 is restarted at time-out.

Then, an AT is received by the UE 10 (step 305), which however is not addressed to the UE 10. Consequently, the UE 10 enters the sleep mode again (steps 306 and 307) and initiates a wake-up procedure, per step 308, before the Regular DRX timer 12 times out. Thereafter, a new cycle of the Regular DRX timer 12 is started, while UL synchronization is assumed and system settings allow the TA to be applied for a second cycle (e.g., 500 ms in total) after the last possible update.

Now, the next AT is addressed to the UE 10 and transmitted together with an indication of DL and UL resources, as in step 309. The network signals, e.g., by a MAC control signaling that the Interim DRX scheme is to be applied at the UE 10. At that stage, the network has knowledge about the DL data buffer and the scheduled Interim DRX scheme (step 310). Thereafter, the network signals a DL control information, e.g., by using the MAC layer, which comprises Interim DRX information, such as Interim DRX interval and Interim DRX starting point (step 311). The Interim DRX information may comprises any Interim DRX parameter or combination mentioned earlier.

The procedure now turns over to FIG. 3B, where the UE 10 transmits, per step 313, UL data which includes an acknowledgement ACK for the DL data and for the switch or change to the Interim DRX scheme which has been taken into use. Additionally, the UL data stream could include an MAC buffer report of the UE 10 for further UL scheduling. The network now has visibility to UL and DL data buffers and may adjust the Interim DRX parameters if needed (step 314).

With the next AT, the Interim DRX settings may be given as starting point and interval, and next DL/UL resource assignment is obtained, as in step 315. The Interim DRX timer 14 at the UE 10 may now be set to a reduced DRX cycle (e.g., 2 ms) and DL data with optional Interim DRX information may be transmitted to the UE 10 (step 316). The UE 10 may respond with an UL data stream, per step 317. After time-out of the Interim DRX timer 14 at the UE, a new AT with next DL/UL resource assignment is signaled (step 318), followed by DL data with optional Interim DRX information (step 319). Again, the UE 10 may send UL data to the network (step 320), until the last scheduled restart of the Interim DRX timer 14 has occurred. Then, the UE 10 enters the sleep mode again, per step 321, and the Regular DRX timer 12 of the UE 10 times out.

The UE 10 always has at least one (default) connection in the active state and the network can see traffic on this LCID and indicate Regular DRX interval, e.g., in the connection release message.

Figure 4A:
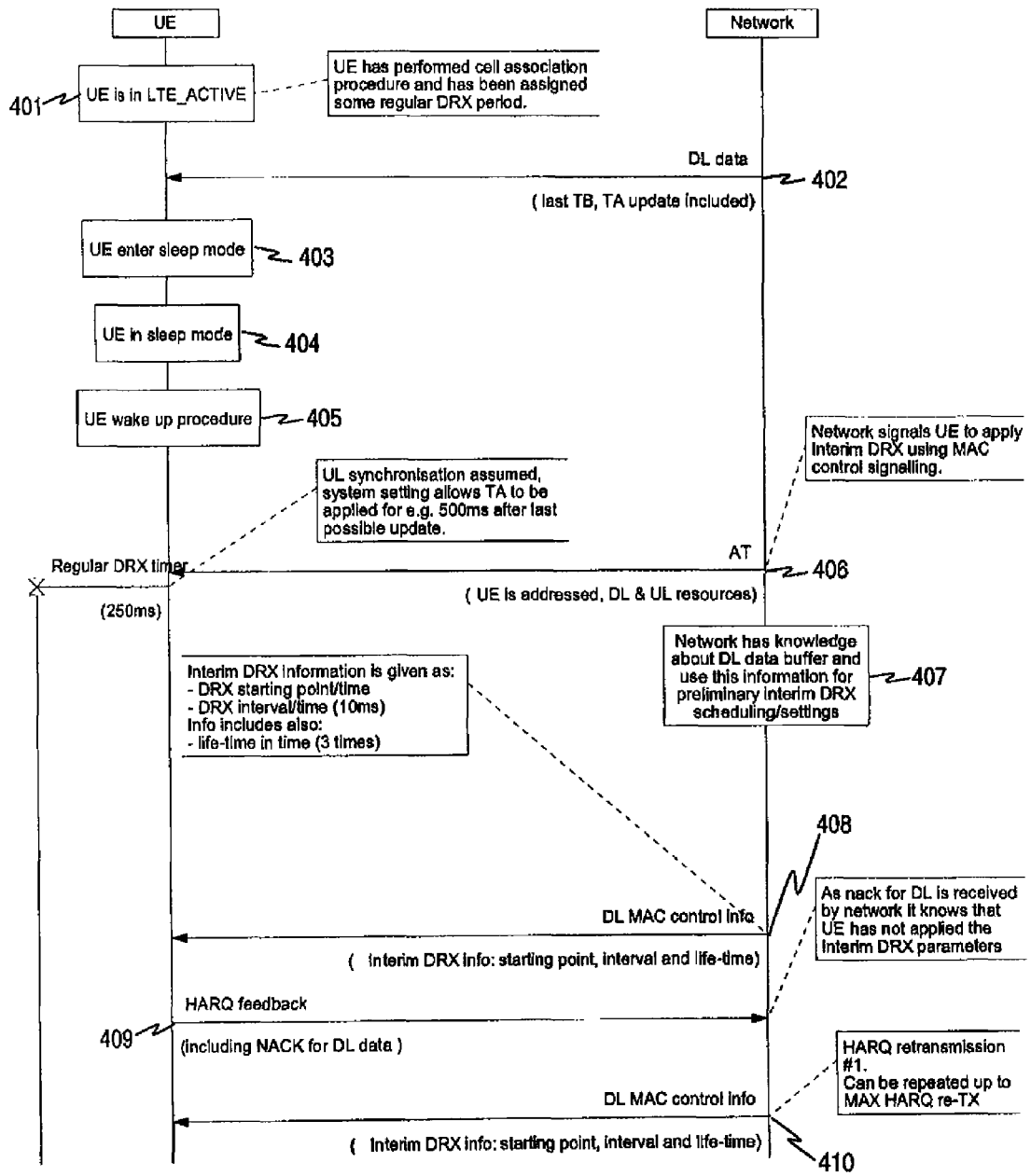
FIGS. 4A and 4B show respective portions of a signaling and processing diagram of an implementation example of simultaneous interim DRX and hybrid retransmission according to one embodiment of the invention.
Figure 4B:
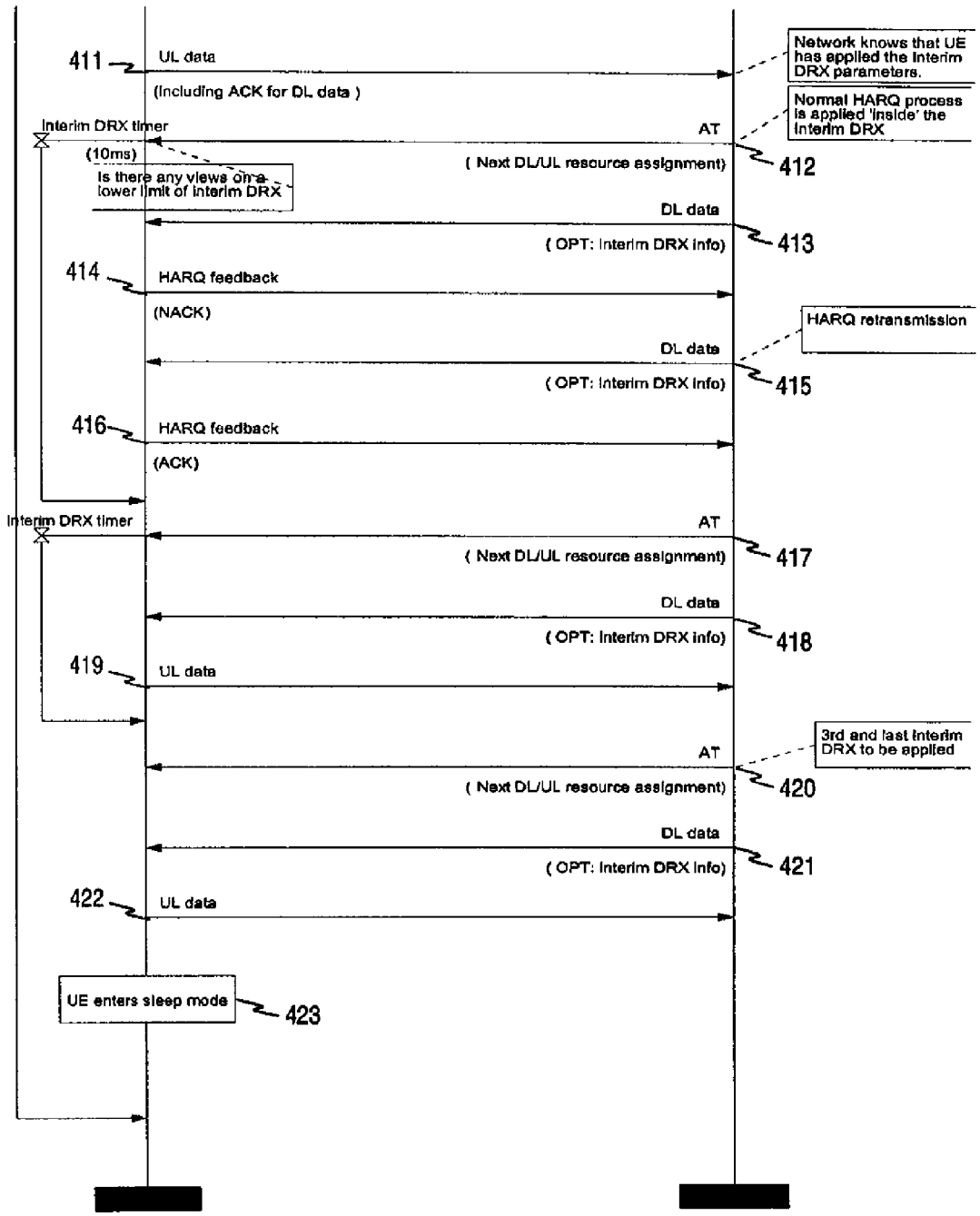

FIGS. 4A and 4B show respective portions of a signaling and processing diagram of a modified implementation example of simultaneous interim DRX and hybrid retransmission according to an exemplary embodiment.

At the beginning of the procedure, as indicated in FIG. 4A, it is again assumed that the UE 10 is in the active mode ("LTE_ACTIVE") which means that it has performed a cell association procedure and has been assigned some regular DRX period (step 401). The transmitted data flow includes the last TB (transport block), which may be the unit of data packages which is sent over the air, and possibly an updated TA, based on which the DRX settings at the UE 10 are updated. Then, the UE 10 enters the sleep mode and stays in the sleep mode (steps 403 and 404). Based on the active DRX cycle, the UE 10 initiates a wake-up procedure, as in step 405, in accordance with the Regular DRX settings (e.g., 250 ms), while it is assumed that the system setting allows TA to be applied for two Regular DRX cycles (e.g., 500 ms) after the last possible update. Moreover, it is again assumed that the Regular DRX timer 12 is restarted at time-out.

Now in step 406, an AT is addressed to the UE 10 and transmitted together with an indication of DL and UL resources. The network signals, e.g., by a MAC control signaling that the Interim DRX scheme is to be applied at the UE 10. At that stage (step 407), the network has knowledge about the DL data buffer and uses this information for preliminary Interim DRX scheduling/settings (step 408). The Interim DRX information may be given as DRX starting point or time, DRX interval/time (e.g., 10 ms) and may also include a life-time value (e.g., 3 cycles). Thereafter, the network signals a DL control information, e.g., by using the MAC layer, which comprises Interim DRX information, such as starting point, interval and life-time.

However, now the network receives, per step 409, from the UE 10 a HARQ feedback including a non-acknowledgement NACK for the DL data. Based on this non-acknowledgement for DL, the network knows that the UE 10 has not applied the Interim DRX parameters (step 410). Therefore, the network initiates a first HARQ retransmission of the DL control information including the Interim DRX information. This procedure can be repeated up to a predefined maximum number of retransmissions.

The procedure now turns over to FIG. 4B, where the UE 10 transmits UL data which now includes an acknowledgement ACK for the DL data (step 411). The network now knows that the UE 10 has applied the Interim DRX parameters and the normal HARQ process is applied "inside" the Interim DRX scheme.

With the next AT, the next DL/UL resource assignment is obtained (step 412). The Interim DRX timer 14 at the UE 10 may now be set to the reduced DRX cycle (e.g., 10 ms) and DL data with optional Interim DRX information may be transmitted to the UE 10, per step 413. The UE 10 responds with a HARQ feedback which indicates a non-acknowledgement NACK (step 414). Consequently, the network initiates a HARQ retransmission of the DL data with optional Interim DRX information, as in step 415. Now, the UE 10 responds with a HARQ feedback which indicates an acknowledgement ACK (step 416).

After time-out of the Interim DRX timer 14 at the UE 10, a new AT with next DL/UL resource assignment is signaled at the re-start of the Interim DRX timer 14, followed by DL data with optional Interim DRX information, per step 417. The UE 10 now sends UL data to the network (step 418), and thereafter the Interim DRX timer 14 times out. With the third and last Interim DRX cycle, a new AT is transmitted with next DL/UL resource assignment followed by new DL data with optional Interim DRX information (steps 419 and 420). Then, in steps 421 and 422, the UE 10 responds with UL data and enters the sleep mode again and the Regular DRX timer 12 of the UE 10 times out.

As an alternative, it is also possible to specify some predefined Interim DRX patterns which could be distributed, e.g., in system information or they could be stated directly in the specification. These pre-defined Interim DRX patterns could then be referred to by the network—allowing a more optimised signalling method and reduce the need for 'end' signals or definitions.

Also, the Interim DRX scheme may set to be only valid within one Regular DRX cycle. This option provides the advantage that the impact of possible error situations is minimized. The Regular DRX scheme is not affected by the use of Interim DRX, and the Regular DRX interval/cycle stays unchanged and is therefore always available for fallback in case of failures in the Interim DRX procedure. Thereby, the network, e.g., node B 20, and the UE 10 will always be able to stay synchronized.

The interim DRX could be assigned and valid for a longer period than one regular DRX. Interim DRX would then be stopped either by direct signaling or 'end'-bit. This will reduce signaling in case of need for assigning consecutive interim DRX.

The Interim DRX can be used as a tool for the network to temporarily increase the data throughput between the UE 10 and the network. In case of a need for more static increase, the network could adjust the Regular DRX interval to comply with the new requirements.

Figure 5:
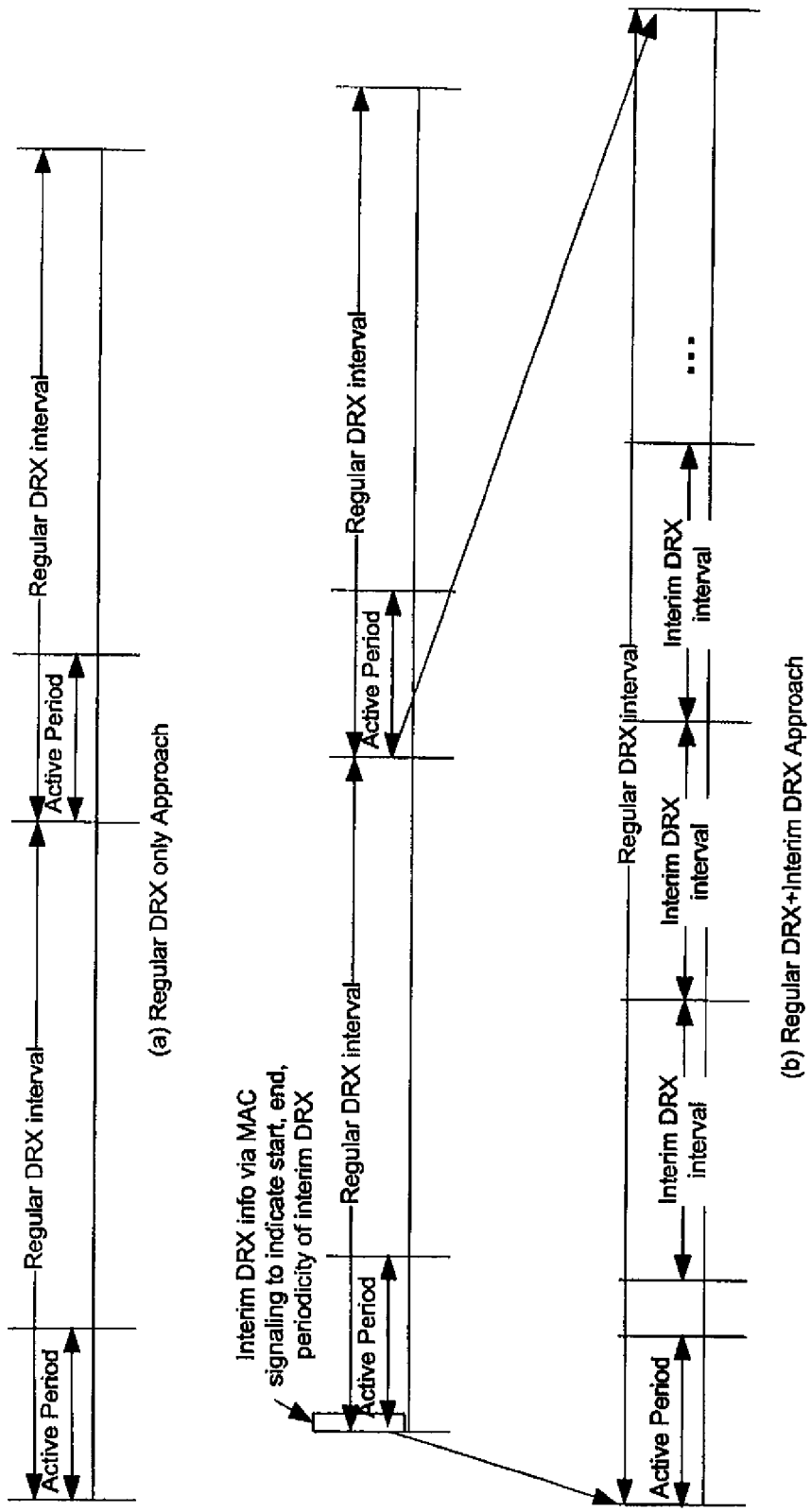
FIG. 5 shows schematic time diagrams for comparison of a regular DRX only concept and a combined DRX concept according to one embodiment of the invention.

FIG. 5 shows schematic time diagrams for comparison of a regular DRX only concept and a combined DRX concept according to one embodiment of the invention.

In particular, a Regular DRX approach is compared to a combined Regular DRX+Interim DRX period approach according to an exemplary embodiment. As indicated by the most upper time diagram, when only the Regular DRX period approach is used, the maximum amount of data which can be received at the UE 10 is limited by the "active periods". When the traffic is very bursty, it is very difficult to estimate the correct length of these active periods. If it is too small, the node B 20 cannot send all buffered traffic to the UE 10. This will cause additional delay in the DL direction. On the other hand, if it is too large, the UE 10 will waste time and power on active period. When the Regular DRX cycle is long (e.g., 5.12 second), the node B 20 needs to wait for a long time until the start of the next Regular DRX cycle. This also increases DL delay.

By using proposed "interim DRX" approach indicated by the lower two time diagrams of FIG. 5, the network can adjust both throughput and periodicity of the DRX period dynamically by using the Interim DRX information signaled via the faster MAC layer. If additional data traffic has arrived, the node B 20 can thus allocate several interim DRX cycles to absorb the additional data traffic within one Regular DRX cycle. Besides, if the node B 20 knows that a bursty traffic will come in the middle of a Regular DRX period, it can reserve some Interim DRX cycles at the beginning of this Regular DRX period to avoid additional delay. It is apparent from the foregoing that the proposed different levels or schemes of DRX could be controlled as well by using a single protocol layer. Then, the control signaling which is required for setting and controlling the Interim DRX scheme and which is provided by the Interim DRX control function or unit 24 by using the same control layer as the Regular DRX control function or unit 22. Both Interim DRX and Regular DRX may in this case be handled through RRC signalling of the RRC layer, or through a control signalling of the MAC layer, or through any other suitable protocol layer. Thereby, the whole DRX scheme can be implemented in one and the same protocol layer, without specific limitation on the type of layer.

In summary, a method, terminal device, network element, system and computer program product for controlling discontinuous reception or transmission at a terminal device of a communication network have been described, wherein a regular discontinuous reception or transmission cycle of a regular discontinuous reception or transmission scheme is set by using a first control layer. In addition thereto, a shorter temporary discontinuous reception or transmission cycle of an interim discontinuous reception or transmission scheme can be set by using a second control layer. Thereby, it is possible to reach two goals of providing long discontinuous reception or transmission cycles for power consumption improvements while at the same time ensuring that the network can easily and flexibly shorten these cycles for increased data throughput, if needed.

Although the above embodiments have been described in connection with an E-UTRAN environment, the invention can be applied to any connection between a terminal device and a network element of any type of communication or data network. Although, in certain embodiments of the invention, only DRX has been addressed, it is apparent that DRX is linked to AT reception in which the UE also receives UL resources. Consequently, the proposed solution is also applicable for DTX (discontinuous transmission). The control signaling or control layers used for transferring the Regular and Interim DRX information or parameters are not restricted to RRC and MAC, respectively. Any control protocol layers may be used, while the Interim DRX parameters may be signaled by using a faster (e.g., lower) protocol layer to thereby ensure a fast change and short Interim DRX cycles. The various embodiments may thus vary within the scope of the attached claims.

The invention claimed is:
1. A method comprising:
setting a regular discontinuous reception or transmission cycle of a regular discontinuous reception or transmission scheme within a terminal device by using a first control layer; and
setting a temporary discontinuous reception or transmission cycle, shorter than said regular discontinuous reception or transmission cycle, of an interim discontinuous reception or transmission scheme within the terminal device by using a second control layer, said second control layer providing faster control signaling than said first control layer,
wherein said temporary discontinuous reception or transmission cycle is set in response to said terminal device having been addressed for data reception.
2. The method according to claim 1, wherein said method is applied when said terminal device is set into an active mode.
3. The method according to claim 1, wherein said first control layer is a radio resource control layer.
4. The method according to claim 1, wherein said second control layer is a media access control layer.
5. The method according to claim 1, wherein said setting of said temporary discontinuous reception or transmission cycle is achieved by signaling at least one of a starting time, an interval, and a life-time for said interim discontinuous reception or transmission scheme via said second control layer.
6. The method according to claim 5, wherein said interval is defined based on a modulus of said regular discontinuous reception or transmission cycle.

7. The method according to claim 5, wherein said life-time is defined based on at least one of a number of frames which can be received within said interim discontinuous reception or transmission cycle, a number of said interim discontinuous reception or transmission cycles within one regular discontinuous reception or transmission cycle, or an end-bit of said second control signaling at the end of said interim discontinuous reception or transmission cycle to indicate the end of interim discontinuous reception or transmission.

8. The method according to claim 5, wherein said life-time is defined by a default value.

9. The method according to claim 8, wherein said default value corresponds to the length of said regular discontinuous reception or transmission cycle.

10. The method according to claim 1, wherein said setting of said temporary discontinuous reception or transmission cycle is achieved by distributing predetermined interim discontinuous reception or transmission patterns and signaling a selected one to said terminal device.

11. The method according to claim 1, wherein setting of said temporary discontinuous reception or transmission cycle comprises indicating a next uplink or downlink resource.

12. The method according to claim 1, wherein said interim discontinuous reception or transmission scheme is set to be valid only for one of said regular discontinuous reception or transmission cycles.

13. The method according to claim 1, further comprising initiating a fallback to said regular discontinuous transmission scheme, if a failure has been detected in said interim discontinuous transmission scheme.

14. The method according to claim 1, wherein said setting steps are controlled based on a dynamic interaction between said regular discontinuous reception or transmission scheme and said interim discontinuous reception or transmission scheme, and wherein said dynamic interaction comprises a decision making step of deciding whether to send said first control layer signaling to adjust said regular discontinuous reception or transmission cycle or to send said second control layer signaling to adjust said interim discontinuous reception or transmission cycle.

15. The method according to claim 14, wherein said decision-making step is based on at least one of a traffic load estimation, at least one radio condition on an air interface to said terminal device, or an algorithm used to calculate signaling overhead.

16. A non-transitory computer-readable storage medium encoded with instructions configured to control a processor to perform the steps of claim 1.

17. A terminal device comprising:
first timer means for timing a regular discontinuous reception or transmission cycle of a regular discontinuous reception or transmission scheme;
second timer means for timing a temporary discontinuous reception or transmission cycle, shorter than said regular discontinuous reception or transmission cycle, of an interim discontinuous reception or transmission scheme; and
setting means for setting said first timer means based on an information received via a first control layer, and for setting said second timer means based on an information received via a second control layer providing faster control signaling than said first control layer,
wherein said terminal device is configured to set said shorter temporary discontinuous reception or transmission cycle in response to having been addressed for data reception.

18. The terminal device according to claim 17, wherein said first control layer is a radio resource control layer.

19. The terminal device according to claim 17, wherein said second control layer is a media access control layer.

20. The terminal device according to claim 17, wherein said setting means is configured to set said temporary discontinuous reception or transmission cycle based on at least one of a starting time, an interval, and a life-time for said interim discontinuous reception or transmission scheme, received via said second control layer.

21. The terminal device according to claim 20, wherein said interval is defined based on a modulus of said regular discontinuous reception or transmission cycle.

22. The terminal device according to claim 20, wherein said life-time is defined based on a number of frames which can be received within said interim discontinuous reception or transmission cycle, a number of said interim discontinuous reception or transmission cycles within one regular discontinuous reception or transmission cycle, or an end-bit of said second control signaling at the end of said interim discontinuous reception or transmission cycle to indicate the end of interim discontinuous reception or transmission.

23. The terminal device according to claim 20, wherein said life-time is defined by a default value.

24. The terminal device according to claim 23, wherein said default value corresponds to the length of said regular discontinuous reception or transmission cycle.

25. The terminal device according to claim 17, wherein said second timer means is configured to set said temporary discontinuous reception or transmission cycle based on a signaled selected one of distributed predetermined interim discontinuous reception or transmission patterns.

26. The terminal device according to claim 17, wherein said setting means is configured to set said interim discontinuous reception or transmission scheme to be valid only for one of said regular discontinuous reception or transmission cycles.

27. The terminal device according to claim 17, wherein said setting means is configured to initiate a fallback to said regular discontinuous transmission scheme, if a failure has been detected in said interim discontinuous transmission scheme.

28. The terminal device according to claim 17, wherein said setting means is controlled based on a dynamic interaction between said regular discontinuous reception or transmission scheme and said interim discontinuous reception or transmission scheme, and wherein said dynamic interaction comprises a decision based on at least one of a traffic load estimation, at least one radio condition on an air interface to said terminal device, or an algorithm used to calculate signaling overhead.

29. The mobile terminal comprising the terminal device according to claim 17.

30. A network element for controlling a terminal device of a communication network, said network element comprising:
first setting means for signaling information used for setting a regular discontinuous reception or transmission cycle of a regular discontinuous reception or transmission scheme by using a first control layer; and
second setting means for signaling information used for setting a temporary discontinuous reception or transmission cycle, shorter than said regular discontinuous reception or transmission cycle, of an interim discontinuous reception or transmission scheme by using a second control layer, said second control layer providing faster control signaling than said first control layer, wherein said network element is configured to set said shorter temporary discontinuous reception or transmission cycle in response to said terminal device having been addressed for data reception.

31. The network element according to claim 30, wherein said first control layer is a radio resource control layer.

32. The network element according to claim 30, wherein said second control layer is a media access control layer.

33. The network element according to claim 30, wherein said second setting means is configured to signal at least one of a starting time, an interval, or a life-time for said interim discontinuous reception or transmission scheme via said second control layer.

34. The network element according to claim 33, wherein said second setting means is configured to define said interval based on a modulus of said regular discontinuous reception or transmission cycle.

35. The network element according to claim 33, wherein said second setting means is configured to define said lifetime based on a number of frames which can be received within said interim discontinuous reception or transmission cycle, a number of said interim discontinuous reception or transmission cycles within one regular discontinuous reception or transmission cycle, or an end-bit of said second control signaling at the end of said interim discontinuous reception or transmission cycle to indicate the end of interim discontinuous reception or transmission.

36. The network element according to claim 30, wherein said second setting means is configured to signal a selected one of distributed predetermined interim discontinuous reception or transmission patterns to said terminal device.

37. The network element according to claim 30, wherein said second setting means is configured to indicate a next uplink or downlink resource.

38. The network element according to claim 30, wherein said network element is a base station device.

39. The network element according to claim 30, wherein said first and second setting means is controlled based on a dynamic interaction between said regular discontinuous reception or transmission scheme and said interim discontinuous reception or transmission scheme, and wherein said dynamic interaction comprises a decision whether to send said first control layer signaling to adjust said regular discontinuous reception or transmission cycle or to send said second control layer signaling to adjust said interim discontinuous reception or transmission cycle.

40. The network element according to claim 39, wherein said decision is based on at least one of traffic load estimation, at least one radio condition on an air interface to said terminal device, and an algorithm used to calculate signaling overhead.

41. The system for controlling discontinuous reception or transmission in a communication network, said system comprising a network element according to claim 30.

42. A network element for controlling a terminal device of a communication network, said network element comprising:
a first setting unit configured to signal information used for setting a regular discontinuous reception or transmission cycle of a regular discontinuous reception or transmission scheme by using a first control layer; and
a second setting unit configured to signal used for setting a temporary discontinuous reception or transmission cycle, shorter than said regular discontinuous reception or transmission cycle, of an interim discontinuous reception or transmission scheme by using a second control layer, said second control layer providing faster control signaling than said first control layer,
wherein said network element is configured to set said shorter temporary discontinuous reception or transmission cycle in response to said terminal device having been addressed for data reception.

43. A terminal device comprising:
a first timer configured to time a regular discontinuous reception or transmission cycle of a regular discontinuous reception or transmission scheme;
a second timer configured to time a temporary discontinuous reception or transmission cycle, shorter than the regular discontinuous reception or transmission cycle, of an interim discontinuous reception or transmission scheme; and
a setting unit configured to set said first timer based on an information received via a first control layer, and for setting said second timer based on an information received via a second control layer providing faster control signaling than said first control layer,
wherein said terminal device is configured to set said shorter temporary discontinuous reception or transmission cycle in response to having been addressed for data reception.

44. A method comprising:
setting a regular discontinuous reception or transmission cycle of a regular discontinuous reception or transmission scheme within a terminal;
setting a temporary discontinuous reception or transmission cycle, shorter than said regular discontinuous reception or transmission cycle, of an interim discontinuous reception or transmission scheme within the terminal; and
performing settings of said regular discontinuous reception or transmission cycle and setting of said shorter temporary discontinuous reception or transmission cycle by using at least one control layer,
wherein said shorter temporary discontinuous reception or transmission cycle is set in response to said terminal device having been addressed for data reception.

45. A non-transitory computer-readable storage medium encoded with instructions configured to control processor to perform the steps of claim 44.

46. A terminal device comprising:
first timer means for timing a regular discontinuous reception or transmission cycle of a regular discontinuous reception or transmission scheme;
second timer means for timing a temporary discontinuous reception or transmission cycle, shorter than said regular discontinuous reception or transmission cycle, of an interim discontinuous reception or transmission scheme; and
setting means for setting said first timer means and said second timer means based on an information received via at least one control layer,
wherein said terminal device is configured to set said shorter temporary discontinuous reception or transmission cycle in response to having been addressed for data reception.

47. A mobile terminal comprising the terminal device according to claim 46.

48. A network element for controlling a terminal device of a communication network, said network element comprising:
first setting means for signaling information used for setting a regular discontinuous reception or transmission cycle of a regular discontinuous reception or transmission scheme; and
second setting means for signaling information used for setting a temporary discontinuous reception or transmission cycle, shorter than said regular discontinuous reception or transmission cycle, of an interim discontinuous reception or transmission scheme,
wherein said first and second setting means are configured to perform said settings by using at least one control layer,
wherein said terminal device is configured to set said shorter temporary discontinuous reception or transmission cycle in response to having been addressed for data reception.

49. A system for controlling discontinuous reception or transmission in a communication network, said system comprising the network element according to claim 48.

50. A network element for controlling a terminal device of a communication network, said network element comprising:
a first setting unit configured to signal information used for setting a regular discontinuous reception or transmission cycle of a regular discontinuous reception or transmission scheme by using a first control layer; and
a second setting unit configured to signal used for setting a temporary discontinuous reception or transmission cycle, shorter than said regular discontinuous reception or transmission cycle, of an interim discontinuous reception or transmission scheme by using a second control layer,
wherein said network element is configured to set said shorter temporary discontinuous reception or transmission cycle in response to said terminal device having been addressed for data reception.

51. A terminal device comprising:
a first timer configured to time a regular discontinuous reception or transmission cycle of a regular discontinuous reception or transmission scheme;
a second timer configured to time a temporary discontinuous reception or transmission cycle, shorter than said regular discontinuous reception or transmission cycle, of an interim discontinuous reception or transmission scheme; and
a setting unit configured to set said first timer and said second timer based on an information received via at least one control layer,
wherein said terminal device is configured to set said shorter temporary discontinuous reception or transmission cycle in response to having been addressed for data reception.

* * * * *